United States Patent [19]

Umemura et al.

[11] Patent Number: 4,715,191
[45] Date of Patent: Dec. 29, 1987

[54] AIR CONDITIONING METHOD

[75] Inventors: Hiroyuki Umemura; Kenji Matsuda; Tomofumi Tezuka; Kazuaki Isono; Hidenori Ishioka, all of Shizuoka; Sakuo Sugawara; Masanori Hara, both of Kamakura, all of Japan

[73] Assignee: Mitsubishi Denki Kabushiki Kaisha, Tokyo, Japan

[21] Appl. No.: 918,725

[22] Filed: Oct. 14, 1986

[30] Foreign Application Priority Data

Oct. 15, 1985 [JP] Japan .................. 60-229075
Oct. 15, 1985 [JP] Japan .................. 60-229071
Oct. 15, 1985 [JP] Japan .................. 60-229072
Oct. 15, 1985 [JP] Japan .................. 60-229073
Aug. 1, 1986 [JP] Japan .................. 61-1544

[51] Int. Cl.⁴ .................................. F25B 41/00
[52] U.S. Cl. .................................. 62/208; 62/126; 62/229; 236/94
[58] Field of Search .............. 62/244, 243, 323.4, 62/229, 208, 126, 127; 236/94, 47; 165/43, 42, 11 R

[56] References Cited

U.S. PATENT DOCUMENTS 3,839,877 10/1974 Kramer .................. 62/126
4,345,714 8/1982 Kojima .................. 236/46 R
4,502,290 3/1985 Suzuki et al. .......... 236/47 X
4,589,593 5/1986 Ishikawa et al. ....... 236/94

FOREIGN PATENT DOCUMENTS 56-137029 10/1981 Japan .

Primary Examiner—Harry Tanner
Attorney, Agent, or Firm—Oblon, Fisher, Spivak, McClelland, & Maier

[57] ABSTRACT

An air conditioning method with use of an air conditioner comprises a step of determining whether or not an input signal is produced from a plurality of switches for providing conditions, a step of determining an established temperature on the basis of the signal from the switches, a step of comparing data provided by the established temperature determining step with the room temperature detected by the temperature detector to produce a signal, and a step of controlling the compressor based on the signal as a result of the comparison.

10 Claims, 24 Drawing Figures

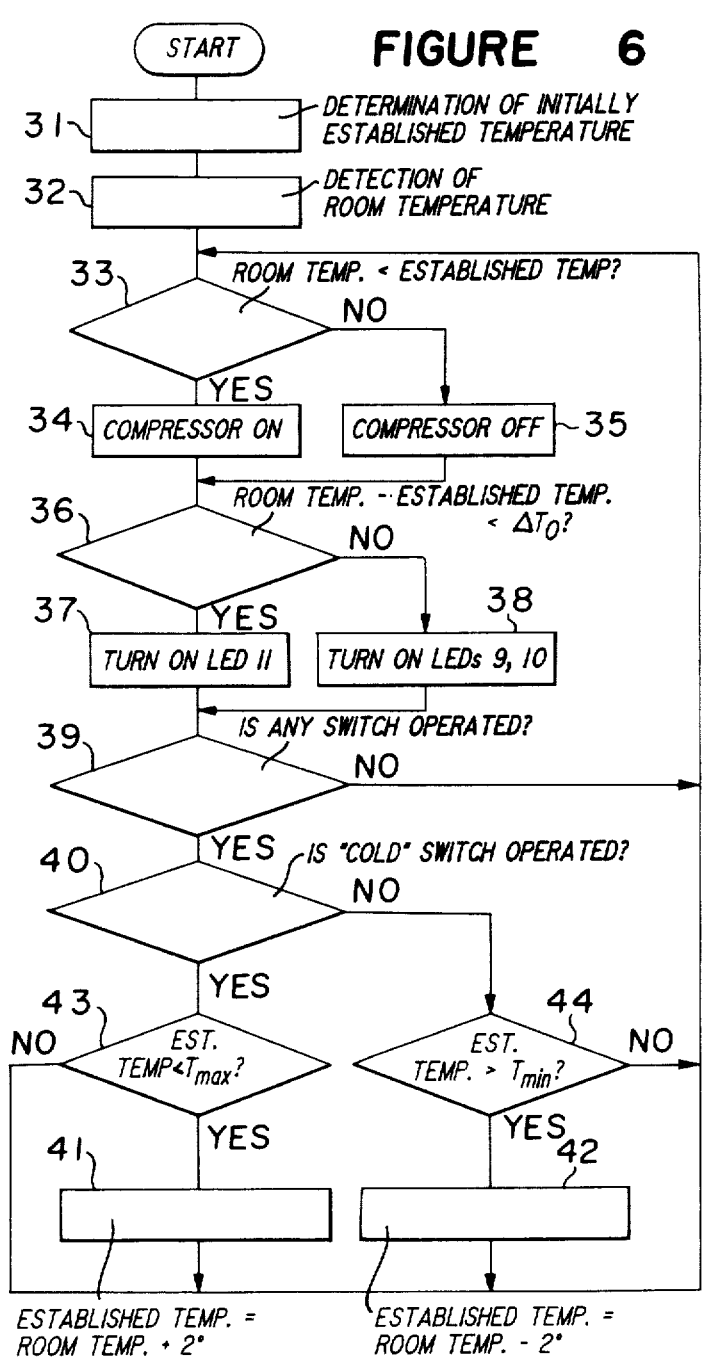

AIR CONDITIONING METHOD

The present invention relates to an air conditioning method with use of an air conditioner to provide a comfortable condition in conformity with preference of a user.

FIG. 24 is a block diagram showing the structure of a control unit of a conventional heat pump type air conditioner disclosed, for instance, in Japanese Unexamined Patent Publication 137029/1981. In FIG. 24, a reference numeral 51 designates an operation switch and a numeral 52 designates a semiconductor thermal sensitive resistance element such as a thermistor which senses the room temperature of a room to be air-conditioned. A detected output of the semiconductor thermal sensitive resistance element is supplied to an analog/-digital (A/D) converter 53 in which a voltage value corresponding to a room temperature detected by the semiconductor thermal sensitive resistance element 52 is converted into a digital signal. The output of the A/D converter 53 is supplied to a room temperature memorizing device 57. An established value determined by an established temperature setting device 54 is memorized in an established temperature memorizing device 58.

The room temperature memorizing device 57, the established temperature memorizing device 58 and a comparison device 59 constitute a microcomputer 55 as an LSI device which operates in accordance with a given program (not shown) upon detection of the closing of an operation switch 51. An output from the comparison device 59 is supplied to a compressor 56 so that it is controlled to be started or stopped by the microcomputer 55.

The microcomputer 55 functions in such a manner that outputs from the A/D converter 53 are read in at a predetermined time interval and are stored as data of room temperature in the room temperature memorizing device 57; an established temperature determined by a signal from the established temperature setting device 54 is stored in the established temperature memorizing device 58; the established temperature $T_s$ in the memorizing device 58 is compared with a room temperature $T_R$ in the room temperature memorizing device 57 by the comparison device 59, and a digital signal "1" for operation or a signal "0" for stoppage is generated to the compressor 56 as a result of the comparison in the comparison device 59.

The operation of the conventional air conditioning apparatus will be described.

Closure of the operation switch 51 actuates the microcomputer 55, whereby comparison of the room temperature $T_R$ with the established temperature $T_S$ specified by the user is carried out in the comparison device 59. When $T_R < T_S$, the comparison device 59 supplies a signal for operation to the compressor 56, whereby room-warming operation using a heat-pump function is initiated. By the operation of the air conditioner, the room temperature is increased to reach the established temperature $T_S$. When the room temperature $T_R$ exceeds the established temperature $T_S$, the compressor 56 receives an instruction of stoppage from the comparison device 59, whereby the air conditioner stops the room-warming operation. When $T_R < T_S$ as a result of reduction in room temperature, an instruction of operation is provided to the compressor 56 to increase the room temperature. By repeating the above-mentioned operations, the room-warming operation using the heat pump function is intermittently carried out by the air conditioner so that the room temperature is maintained near the established temperature $T_S$.

In the conventional air conditioner, however, there has been a problem that an user has to control the room temperature by specifying the established temperature, and he can not input a signal corresponding to his feeling of hot or cold. Namely, he had to input his feeling of temperature as an established temperature when he feels hot or cold.

It is an object of the present invention to provide an air conditioning method which provides a comfortable condition by directly inputting user's feeling on hot or cold into an air conditioner.

The foregoing and the other objects of the present invention have been attained by providing an air conditioning method with use of an air conditioner which comprises a compressor placed in an air conditioner main body, a temperature detector for detecting temperature in a room, an A/D converter for converting an output from the temperature detector into a digital signal and a microcomputer which stores the output of the A/D converter and an established value of temperature and compares the former with the later thereby to produce an instruction signal to the compressor, characterized by comprising a step of determining whether or not an input signal is produced from a plurality of switches for specifying a condition, a step of determining an established temperature on the basis of the signal from said switches, a step of comparing data provided at the established temperature determining step with the room temperature detected by the temperature detector to produce a signal, and a step of controlling the compressor based on the signal as a result of the comparison.

IN THE DRAWINGS

FIGS. 6 and 7 are respectively flow charts showing the controlling operation in second and third embodiments of the air conditioning method of the present invention;

In the following, preferred embodiments of the air conditioning method according to the present invention will be described with reference to drawings.

Figure 1:
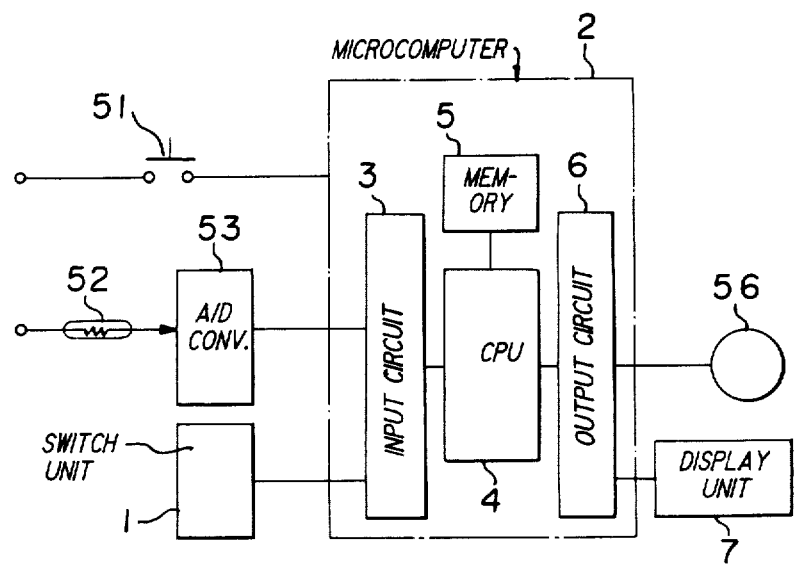
FIG. 1 is a block diagram of a first embodiment of a control unit of the air conditioner to which the present invention is applied.
Figure 2:
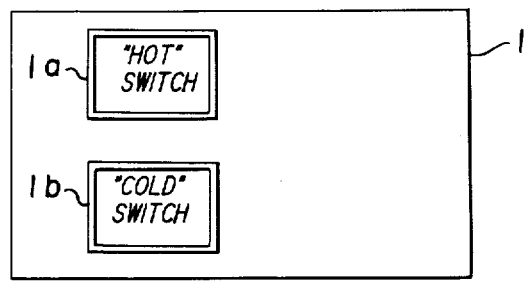
FIG. 2 is a front view showing a switch unit in the control unit of the air conditioner.
Figure 24:
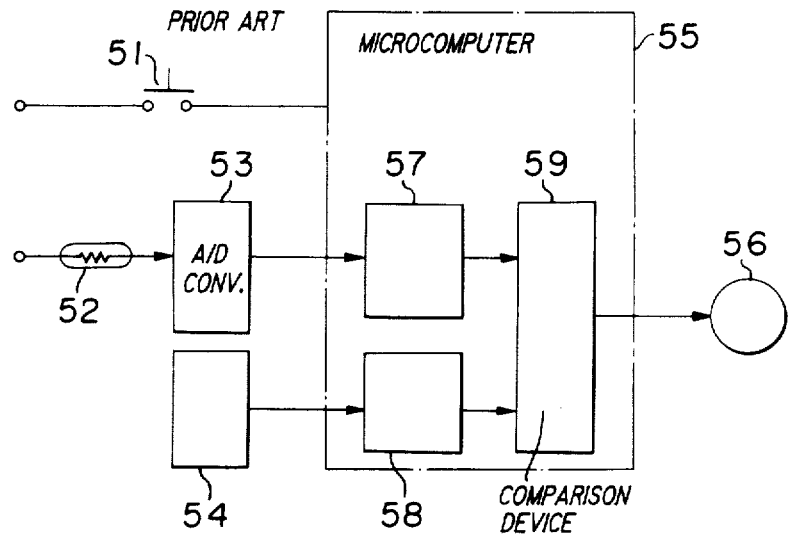
FIG. 24 is a block digram of a conventional control unit for an air conditioner.

FIG. 1 is a block diagram of the control unit of the air conditioner to which the present invention is applicable. In FIG. 1, the same reference numerals as in FIG. 24 designate the same or corresponding parts. A reference numeral 1 designates a switch unit which comprises a "hot" switch 1a to be operated when a user feels hot and a "cold" switch 1b to be operated when he feels cold (FIG. 2). The switch unit 1 is connected to an input circuit 3 in the microcomputer 2. The microcomputer 2 comprises the input circuit 3, a CPU 4 having an established temperature determining means for determining the established or set points temperature, a memory 5 and an output circuit 6. The input circuit 3 also receives an output signal from the semiconductor thermal sensitive resistance element 52 as a temperature detector to detect a room temperature through the A/D converter 53.

Figure 3:
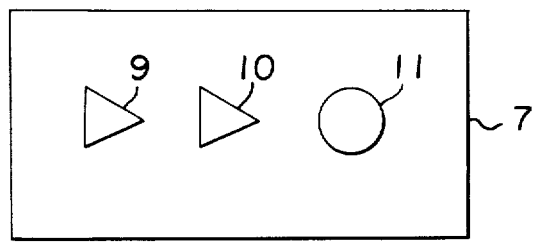
FIG. 3 is a front view of a display unit in the control unit in the air conditioner.

An output from the output circuit 6 causes actuation or stoppage of the compressor 56 and turning-on or off of electroluminescence diodes 9, 10, 11 in a display unit 7 (FIG. 3).

Figure 5:
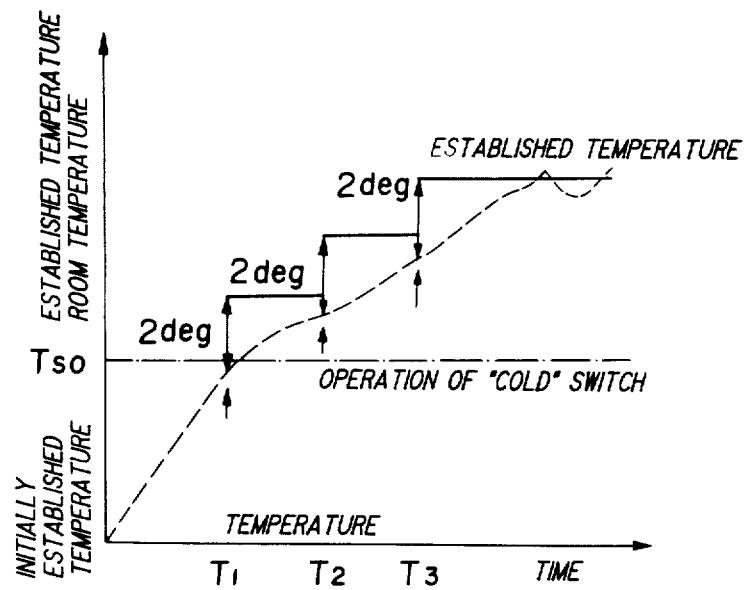
FIG. 5 is a diagram showing change in room temperature performed by the first embodiment.
Figure 4:
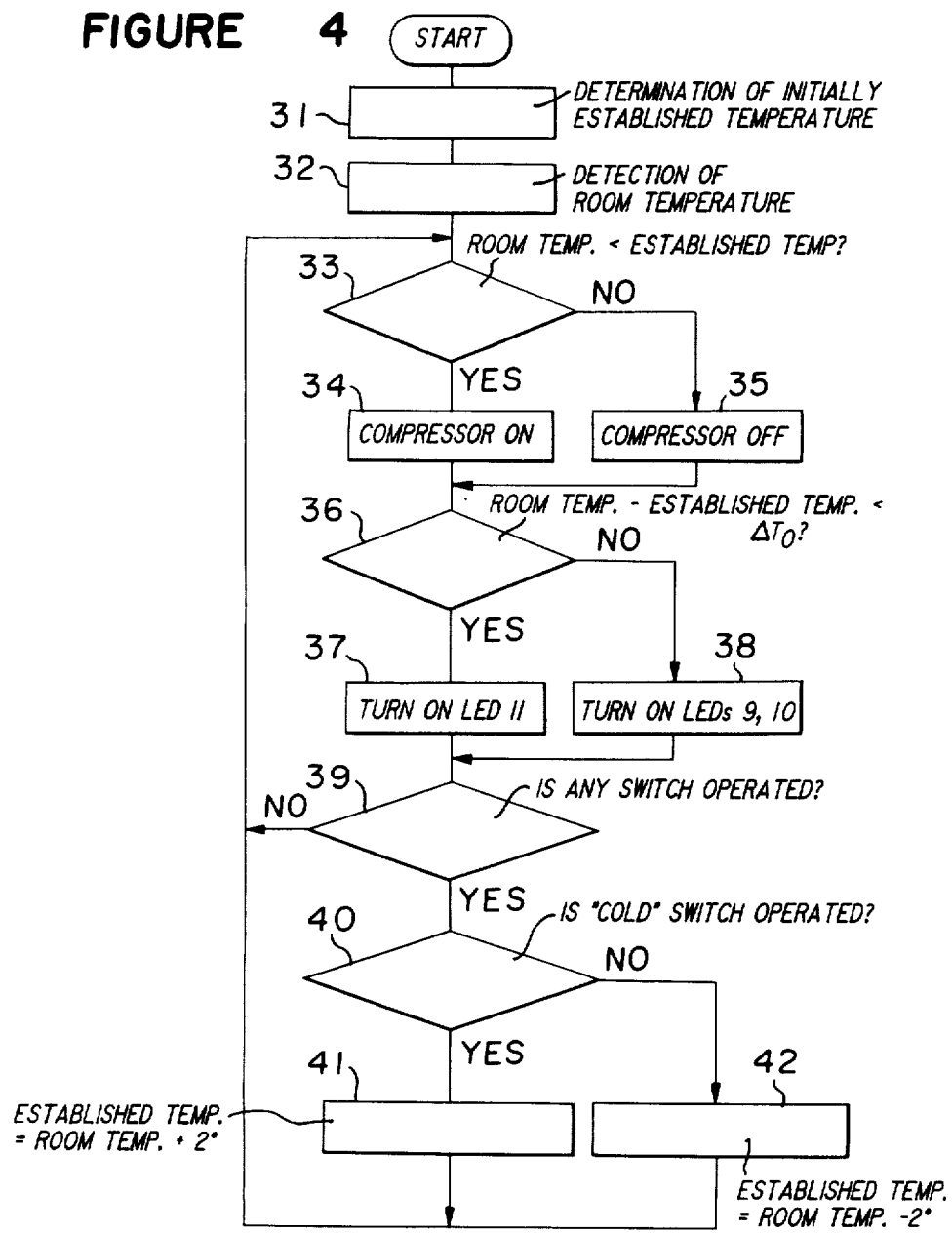
FIG. 4 is a flow chart of the first embodiment showing the operation of the control unit.

The air conditioning method according to the first embodiment of the present invention will be described with reference to FIGS. 4 and 5. FIG. 4 is a flow chart showing a program on determination of an established temperature memorized in the memory 5 of the microcomputer 2, and FIG. 5 is a characteristic diagram showing change in room temperature when room-warming operation is performed by the air conditioner having the control unit as shown in FIG. 1.

On turning on the operation switch 51, the program in the flow chart in FIG. 4 starts, and an initially established temperature is determined at Step 31. A value of the room temperature detected by the semiconductor thermal sensitive resistance element 52 is input in the microcomputer 2 at Step 32. At Step 33, the room temperature is compared with the established temperature. As a result of the comparison, an instruction of ON or OFF is provided to the compressor 56 through the output circuit 6 so as to correspond to operation mode at Step 34 or 35. Namely, when the room temperature is lower than the established temperature at Step 33, the compressor 56 is actuated at Step 34. Contrary, when the room temperature is higher than the established temperature, the compressor 35 is stopped.

Steps 36 through 42 show a sequence for determining the established temperature. When difference between the intially established temperature and the room temperature falls within a given range of value $\Delta T_o$ at Step 36, the LED 11 having a round shape in the display unit 7 as shown in FIG. 3 is operated to indicate to the user that the room temperature reaches the initially established temperature at Step 37. Irrespective of the operation of the LED 11, when any switch is operated at Step 39, determination is made as to whether the "hot" switch 1a is operated or the "cold" switch 1b is operated at step 40.

When the "cold" switch 1b is operated, the established temperature is increased by a predetermined value, for instance 2 degree, with reference to the room temperature at the time of operating the "cold" switch, at Step 41.

When the "hot" switch 1a is operated, the established temperature is reduced by a predetermined value, for instance 2 degree, with reference to the room temperature at the time of operating the "hot" switch, at Step 42.

At Step 36, when the difference between the initially established temperature and the room temperature does not fall within a given value $\Delta T_o$, the LEDs 9, 10, each having a triangular shape in the display unit as shown in FIG. 3, are operated at Step 38, whereby the user knows that the room temperature does not reach the initially established temperature.

In case that the established temperature is changed, the subsequent operation is carried out with reference to the changed established temperature, and the compressor 36 is controlled according to the sequence starting from Step 32 so that temperature condition is controlled so as to keep the established temperature and the room temperature constant.

In FIG. 5 showing the characteristic diagram of change in room temperature, the room-warming operation is started to reach the initially established temperature. In the operation, if the user feels a room to be excessively cool, the "cold" switch 1b is operated. Then, the established temperature is changed to a predetermined higher value with respect to the room temperature at the time of operating the switch, and room-warming operation is continued to increase the room temperature.

When the "hot" switch 1a is operated, the established temperature is changed to a predetermined lower value with respect to the room temperature at the time operating the "hot" switch, and the operation is stopped until the room temperature becomes lower than the established temperature.

FIG. 6 is a flow chart showing a program of determination of the established temperature memorized in the microcomputer according to the second embodiment of the present invention. The sequence as shown in FIG. 6 is the same as that of FIG. 4 provided that an upper limit and a lower limit are provided for the established temperature at Steps 43 and 44 respectively which follow after Step 40. Accordingly, even when any switch is erroneously operated or one of the switches is operated several times, change of the established temperature is limited within a certain range.

Figure 7:
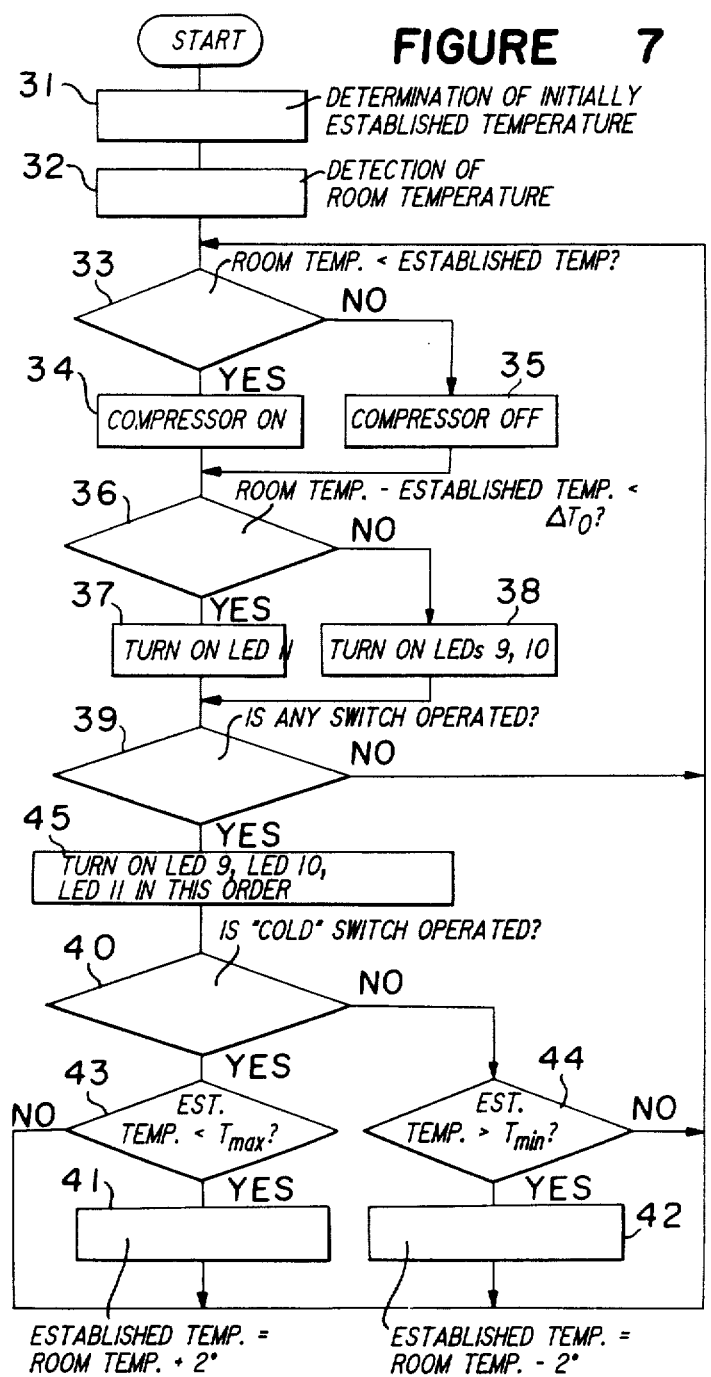

FIG. 7 is a flow chart of the air conditioning method according to the third embodiment of the present invention. The sequence of the method is the same as that shown in FIG. 4 provided that at Step 45, the LEDs 9, 10, 11 are repeatedly turned on and off cyclicly in this order after Step 39, whereby the user knows that any of the switches has been operated.

Figure 8:
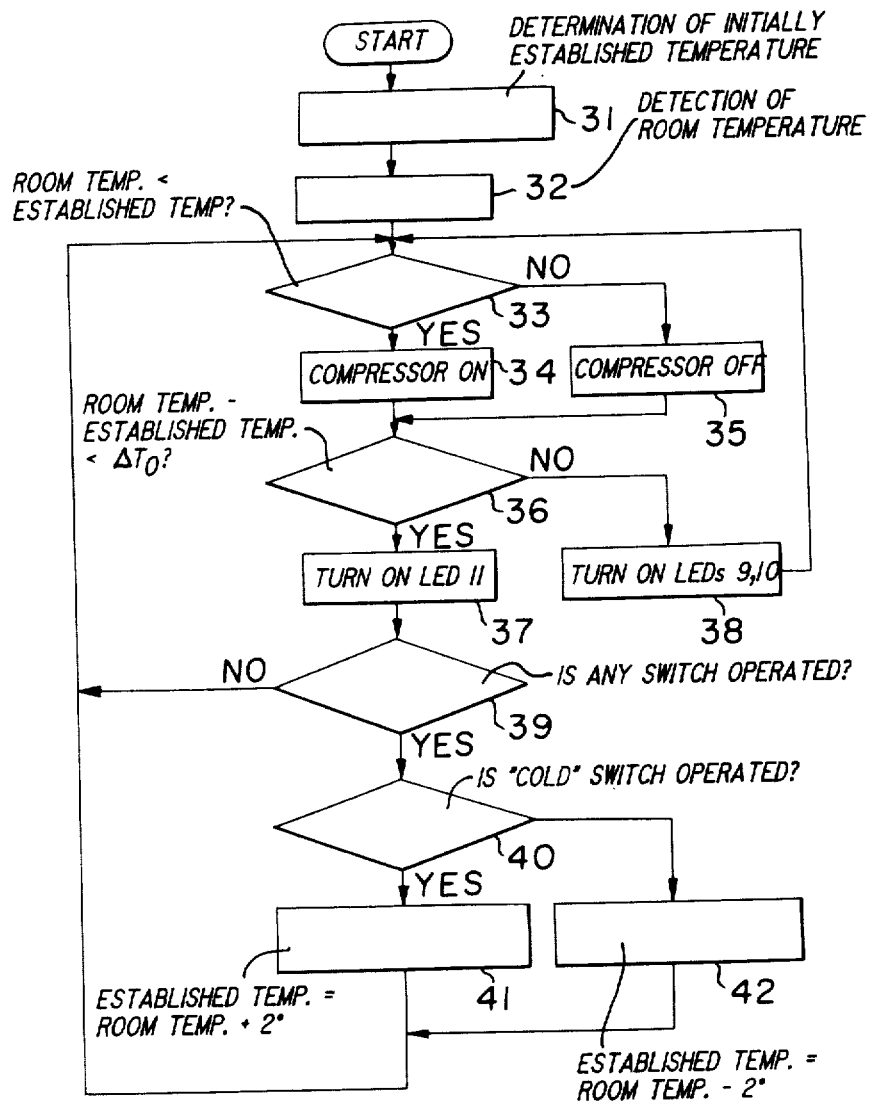
FIG. 8 is a flow chart according to the fourth embodiment of the present invention.

FIG. 8 is a flow chart showing the sequence of the air conditioning method according to the fourth embodiment of the present invention. The flow chart of the FIG. 8 is the same as that in FIG. 4 provided that when the difference between the initially established temperature and the room temperature does not fall in a predetermined range of value $\Delta T_o$, the LEDs 9, 10 having the triangular window in the display unit 8 are operated to inform to the user the fact that the room temperature does not reach the intially established temperature, at Step 38. In this case, the established temperature is not changed even though the switch unit 1 is operated. Namely, even though the user feels cold before the difference between the intially established temperature and the room temperature falls in the range of value $\Delta T_o$ after the room-warming operation has been started, and he operates the "cold" switch, the established temperature is not changed and the room-warming operation is continued while keeping the initially established temperature. Then, when the difference between the initially established temperature and the room temperature falls in the range of value $\Delta T_o$ and when the user feels the room cold, the "cold" switch is operated by the user. Then, the established temperature is brought to a predetermined higher value with respect to the room temperature at the time of operating the "cold" switch, whereby the room-warming operation is continued to further increase the room temperature. Contrary, when the "hot" switch is operated, the established temperature is brought to a predetermined lower value with respect to the room temperature at the time of operating the switch, whereby the room-warming operation is stopped until the room temperature becomes lower than the established temperature.

Figure 9:
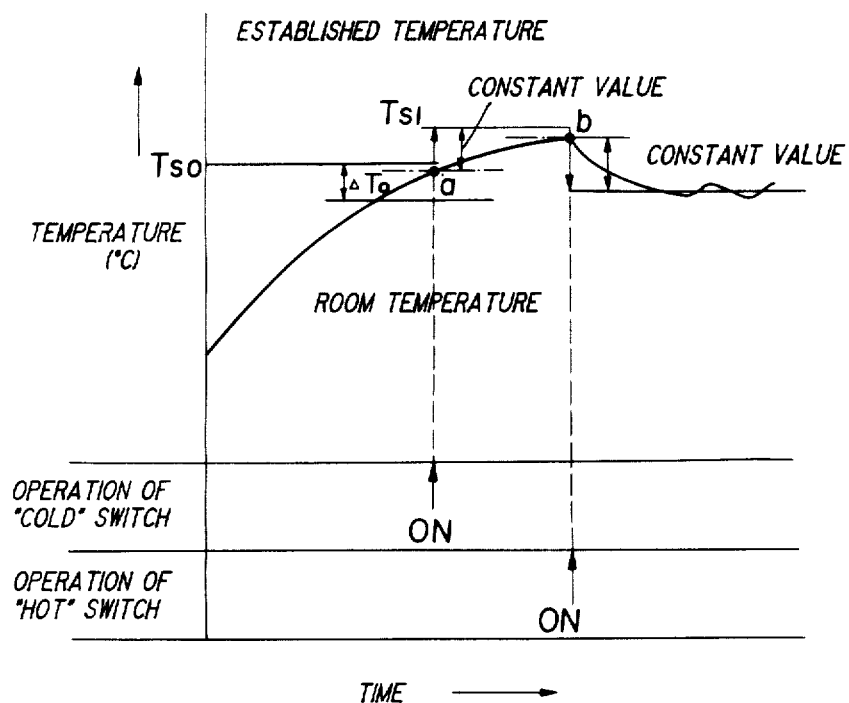
FIG. 9 is a diagram showing change in room temperature in the fourth embodiment.

FIG. 9 is a characteristic diagram showing change in the room temperature in the room-warming operation according to the fourth embodiment.

The fifth embodiment of the present invention will be described.

Figure 10:
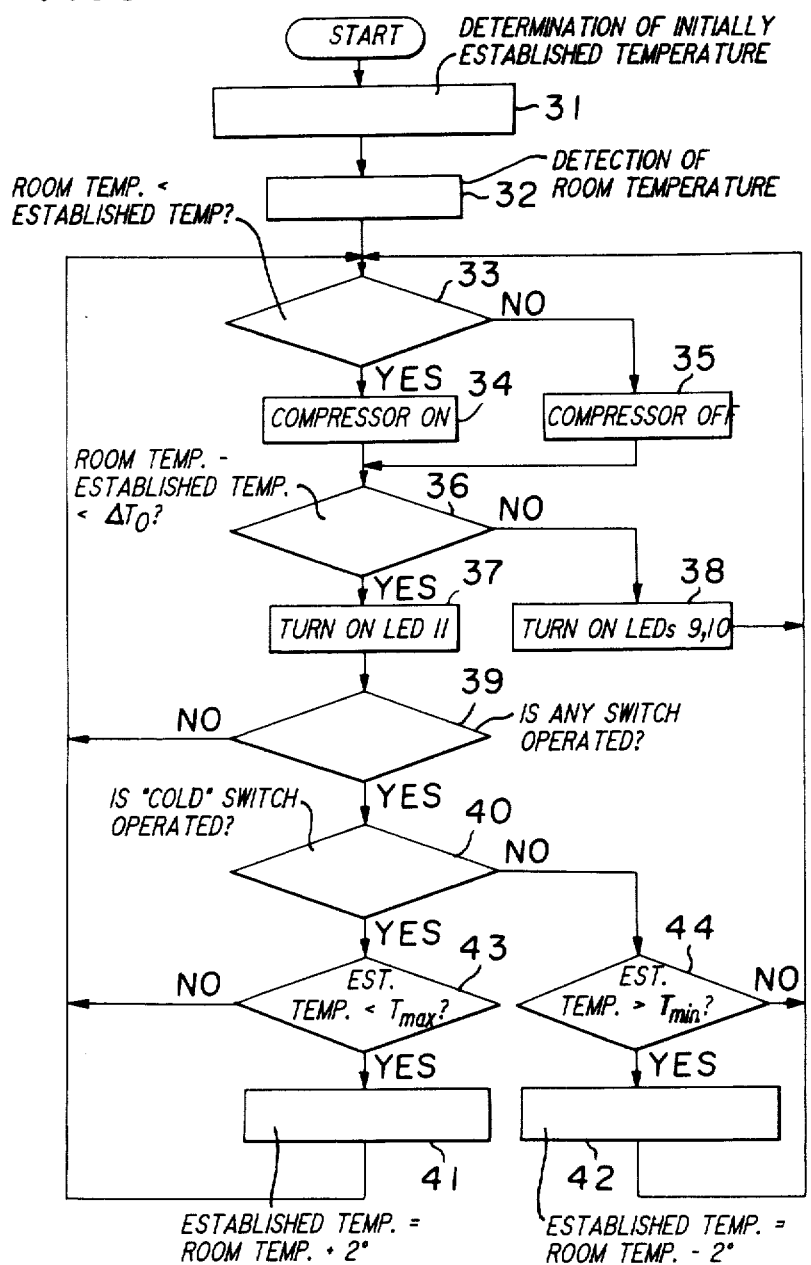
FIGS. 10 and 11 are respectively flow charts according to fifth and sixth embodiments of the present invention.

FIG. 10 is a flow chart showing a program of determining the established temperature memorized in the microcomputer. The flow chart as shown in FIG. 10 is the same as that shown in FIG. 8 provided that an upper limit value is provided for the established temperature at Step 43 and a lower limit value is provided for the established temperature at Step 44. Accordingly, even when any one of the switches is erroneously operated or the same switch is operated several times, change in the established temperature is limited within a certain range.

Figure 11:
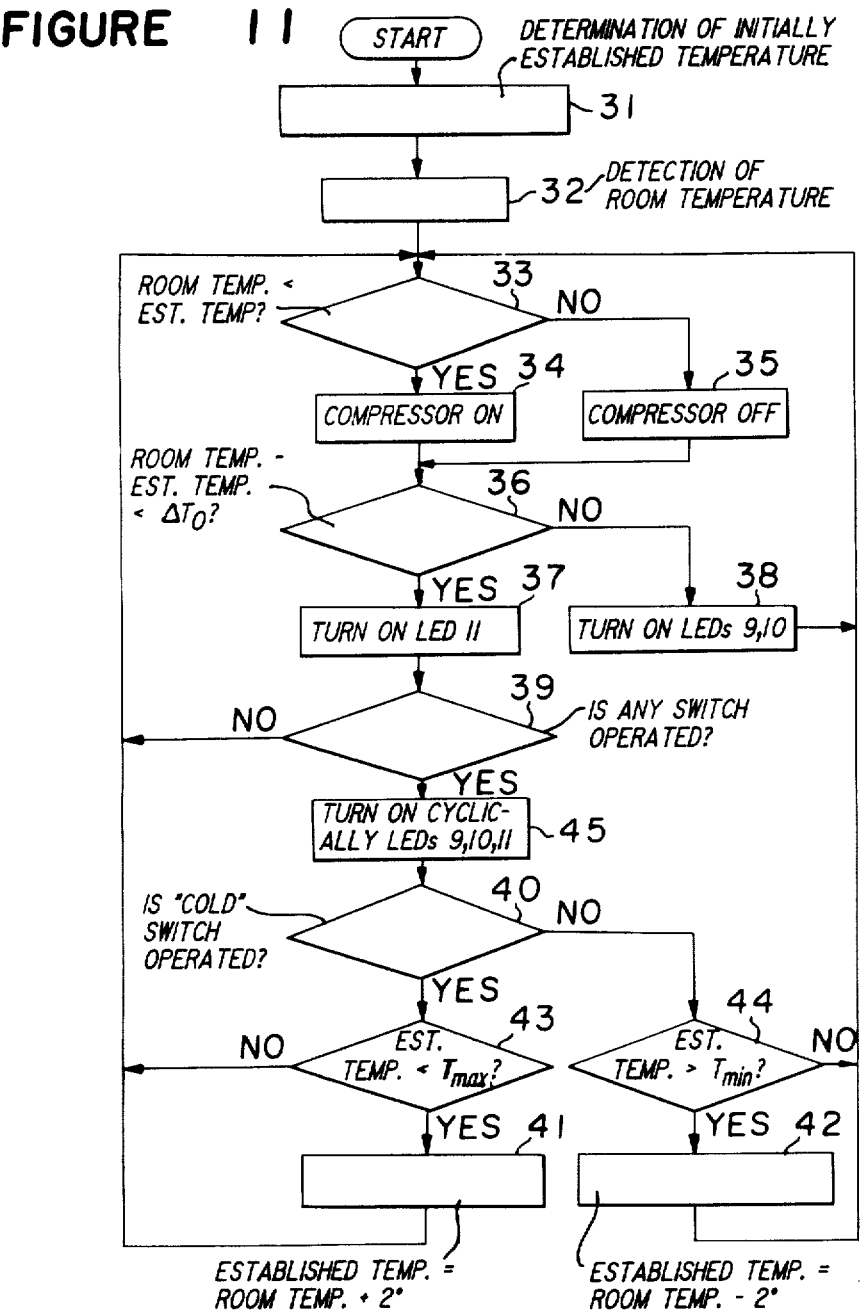

FIG. 11 is a flow chart of the air conditioning method according to the sixth embodiment of the present invention. The sixth embodiment is the same as the fifth embodiment provided that Step 45 is added after Step 39. Namely, when any of the switches is operated at Step 39, the LEDs 9, 10, 11 in the display unit 8 are repeatedly turned on and off in this order in a cyclic manner, whereby the user knows that the switch unit is operated.

In the first through sixth embodiments, the switch unit to be operated according to the users feeling of hot or cold and the display unit are provided. When the switch unit is operated, a signal from the switch unit is supplied to the microcomputer to operate at the display unit, and at the same time, the established temperature is changed. Accordingly, a comfortable condition is easily obtainable in accordance with users preference.

Figure 12:
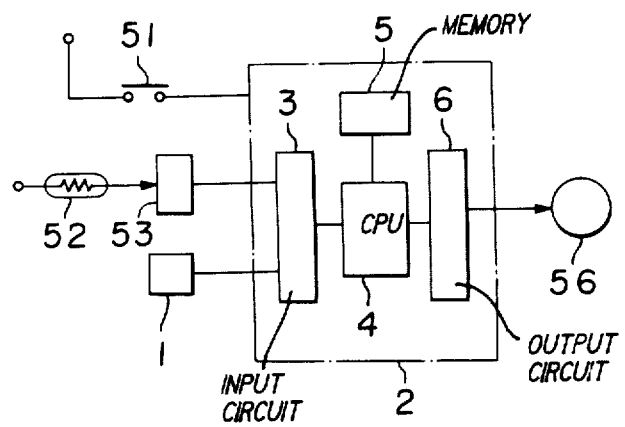
FIG. 12 is a block diagram showing the construction of the control unit of an air conditioner to which a seventh embodiment of the present invention is applicable.
Figure 13:
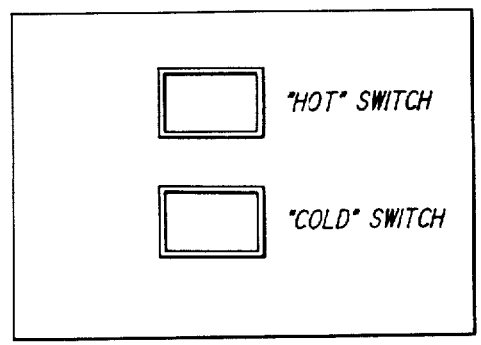
FIG. 13 is a front view of a switch unit used for the control unit as shown in FIG. 12.

FIG. 12 is a block diagram showing the construction of the control unit of the air conditioner to which the seventh embodiment of the air conditioning method is applicable. In FIG. 12, the same reference numerals as in FIG. 1 designate the same or corresponding parts, and therefore description of these parts is omitted.

The operation of the seventh embodiment will be described with reference to FIGS. 12 to 15.

Figure 14:
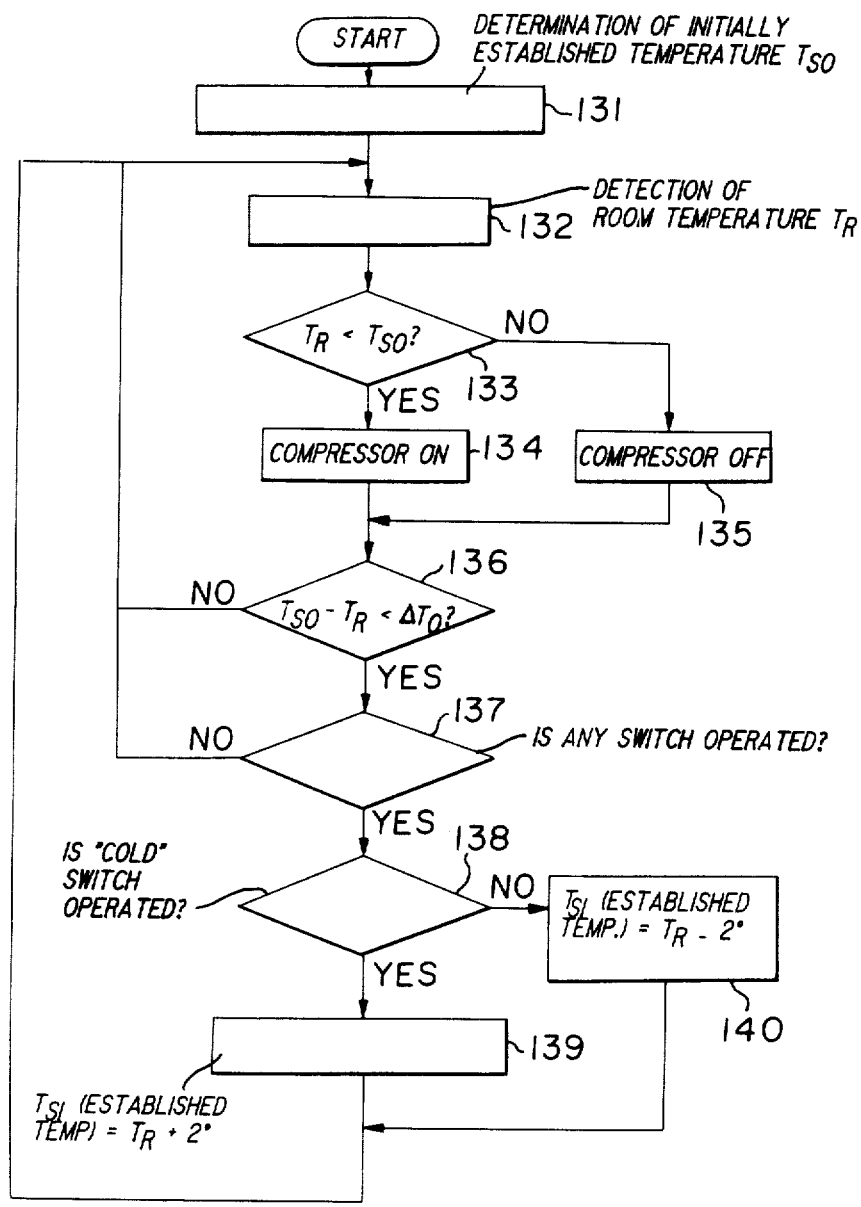
FIG. 14 is a flow chart showing the operation of the seventh embodiment of the present invention.
Figure 15:
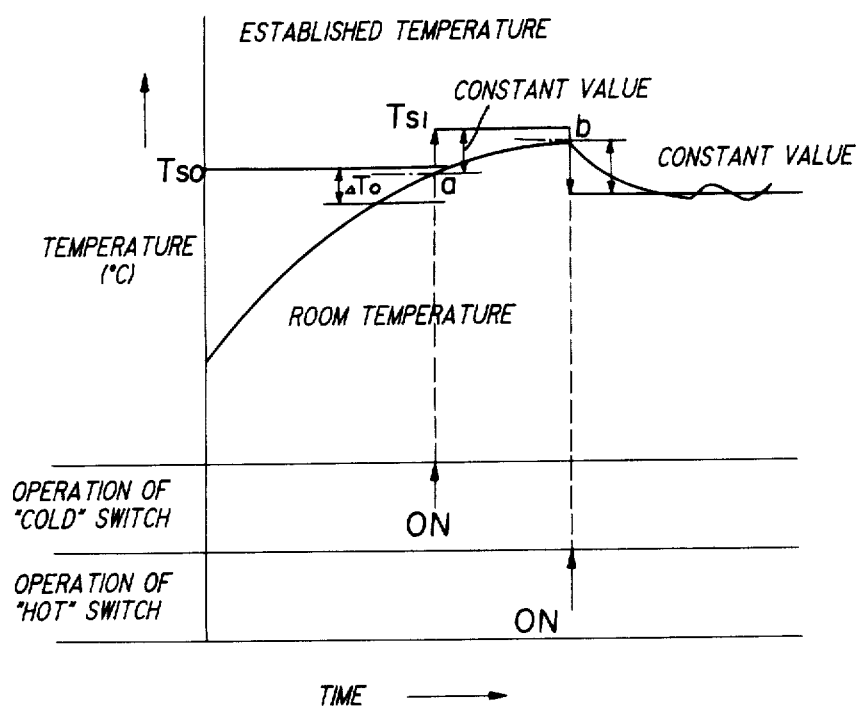
FIG. 15 is a diagram showing change in room temperature in the seventh embodiment.

FIG. 14 is a flow chart showing a program of determining the established temperature memorized in the memory 5 of the microcomputer 2, and FIG. 15 is a characteristic diagram showing change in room temperature in the room-warming operation.

On operating the operation switch 51, the program as shown in FIG. 14 is started. At Step 131, an initially established temperature $T_{so}$ is determined. At Step 132, a room temperature detected by the thermal sensitive resistance element 52 is input in the input circuit 3. At Step 133, the room temperature $T_R$ is compared with the established temperature $T_{so}$. As a result of the comparison, an instruction is provided to the compressor 56 through the output circuit 6 to start or stop the compressor 56 at Step 134 or Step 135. Steps 136 through 140 constitute the sequence of determination of the established temperature. Namely, when the difference between the intially established temperature $T_{so}$ and the room temperature $T_R$ falls within a predetermined range of value $\Delta T_o$ at Step 136 and when any switch is operated, determination is made as to whether the "hot" switch is operated or the "cold" switch is operated at Step 138. When the "cold" switch is operated, the established temperature $T_{s1}$ is increased by a predetermined value, for instance 2 degree, with reference to the room temperature at the time of operating the "cold" switch at Step 139. When the "hot" switch is operated, the established temperature $T_{s1}$ is decreased by a predetermined value, for instance 2 degree, with reference to the room temperature at the time of operating the "hot" switch at Step 140. Then, the sequence is again started from Step 132 with the modified established temperature, and the compressor is subjected to ON and OFF control from Step 132, whereby temperature condition is controlled so as to meet the room temperature with the established temperature.

FIG. 15 is a characteristic diagram showing change in room temperature in the room-warming operation according to the seventh embodiment.

The room-warming operation is started to reach the initially established temperature. The user may feel cold before the difference between the initially established temperature $T_{so}$ and the room temperature falls within the range of value $\Delta T_o$ after a certain time has passed from the initiation of operation. In this case, even though the user operates the "cold" switch, the established temperature does not change and the room-warming operation is continued with the initially established temperature $T_{so}$. Then, the difference between the initially established temperature $T_{so}$ and the room temperature becomes smaller than the value $\Delta T_o$ after further certain time has passed from the initiation of the operation. In this case, operation of the "cold" switch by the user who still feels cold, brings the established temperature to a predetermined higher value with reference to the room temperature at the time of operating the "cold" switch, whereby the room-warming operation is continued to increase the room temperature.

Contrary, when the "hot" switch is operated, the established temperature is changed to a predetermined lower value with reference to the room temperature at the time of operating the "hot" switch, whereby the room-warming operation is stopped until the room temperature is lower than the established temperature.

The eighth embodiment of the present invention will be described.

Figure 16:
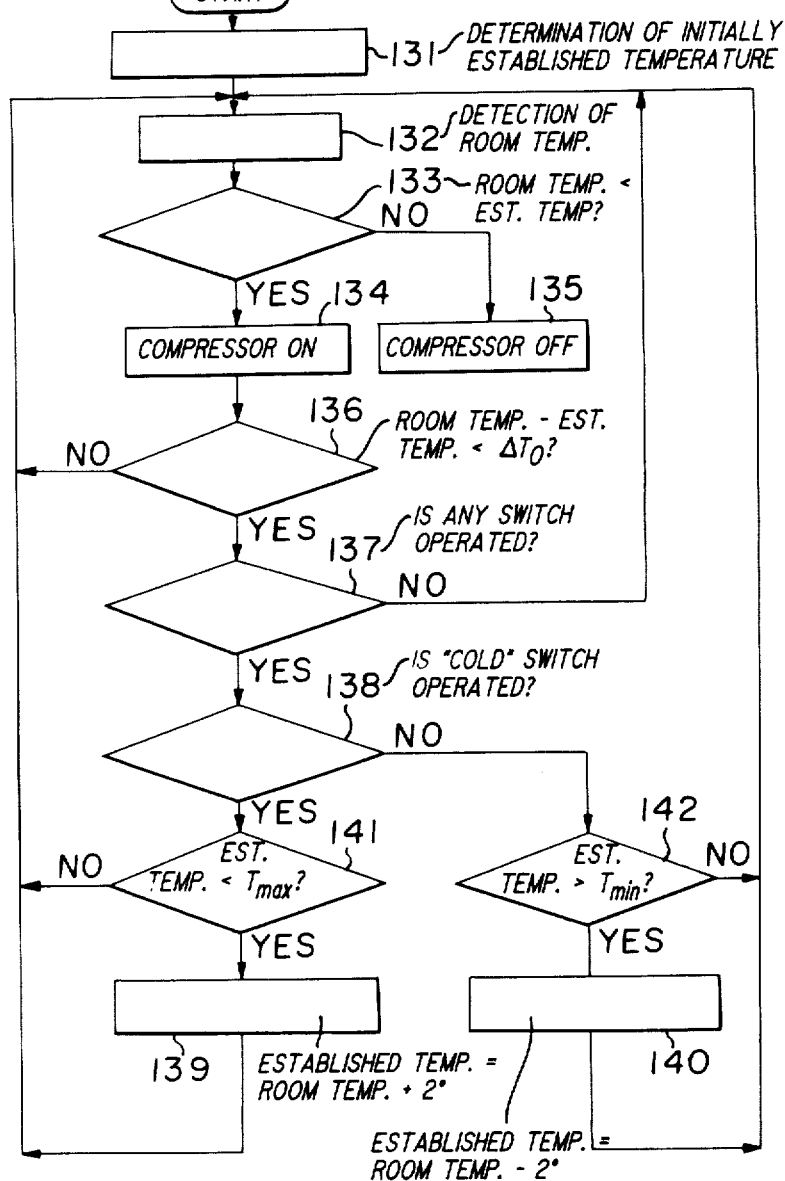
FIG. 16 is a flow chart showing the operation of an eighth embodiment of the present invention.

FIG. 16 is a flow chart showing a program of determining the established temperature stored in the microcomputer. The flow chart shown in FIG. 16 is the same as that shown in FIG. 14 provided that an upper limit is provided for the established temperature at Step 141 and a lower limit is provided for it at Step 142. Accordingly, even when the switch unit is erroneously operated and the same switch is operated several times, change in the established temperature is limited within a certain range.

In accordance with the seventh and eighth embodiments, the switch unit is operated according to the users feeling of temperature, and the established temperature is automatically changed corresponding to the operation of the switch. Accordingly, a comfortable condition can be easily attained to meet the users preference.

Figure 17:
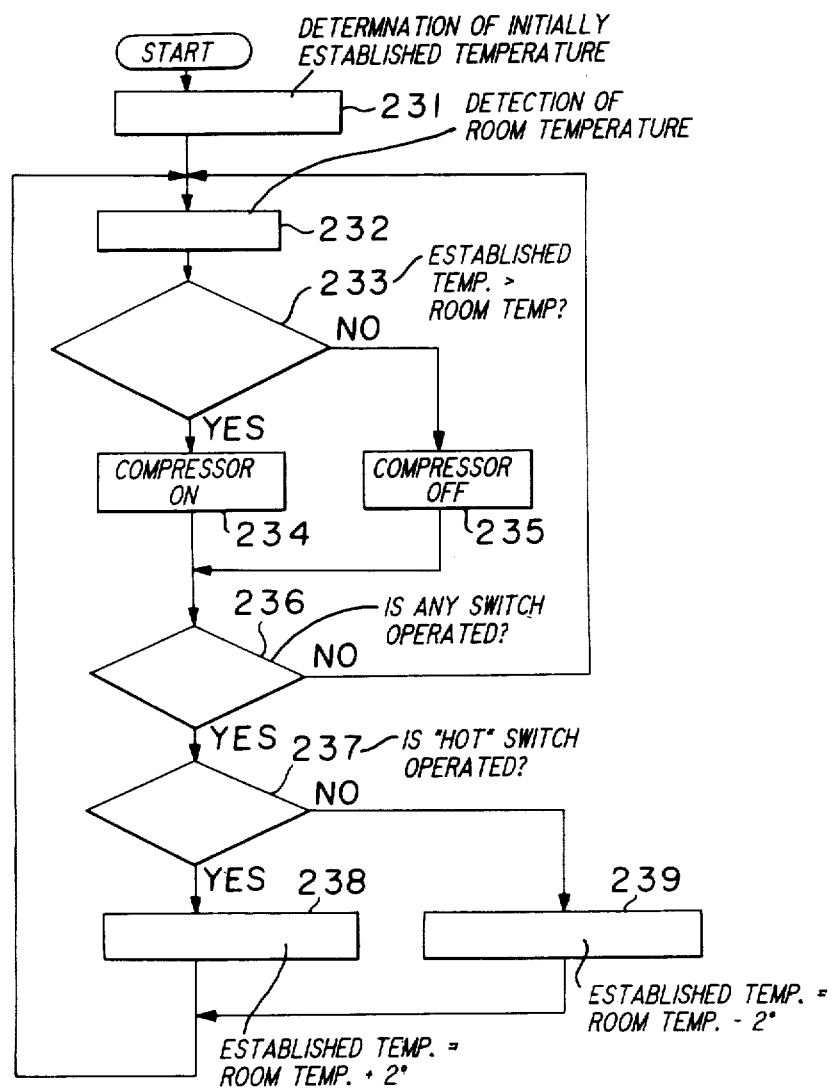
FIG. 17 is a flow chart showing the operation of a ninth embodiment of the present invention.

In the next place, the ninth embodiment of the present invention will be described with reference to FIGS. 17 and 18. FIG. 17 is a flow chart showing a program of determination of the established temperature memorized in the microcomputer 2.

Explanation will be made as to room-warming operation.

When the operation switch 51 is operated, the flow as shown in FIG. 17 is started and the initially established temperature is determined at Step 231. A room temperature detected by the thermal sensitive resistance element 52 is input in the input circuit at Step 232. At Step 233, the room temperature detected is compared with the established temperature. As a result, an instruction of start or stop is given to the compressor 56 through the output circuit 6 at Step 234 or 235.

Steps 236 through 239 concern determination of the established temperature. Namely, when any switch is operated at Step 236, determination is made as to whether the "hot" switch is operated or the "cold" switch is operated at Step 237. If the "hot" switch is operated at Step 238, the established temperature is reduced to a predetermined lower value, for instance, it is decreased by 2 degree, with reference to the room temperature at the time of operating the "hot" switch. If the "cold" switch is operated, the established temperature is increased by a predetermined value, for instance 2 degree, with reference to the room temperature at the time of operating the "cold" switch at Step 239. The data of modified established temperature is applied to the sequence from Step 232 so that the compressor is started or stopped. Thus, temperature condition is controlled so that the established temperature and the room temperature is controlled to be constant.

Figure 18:
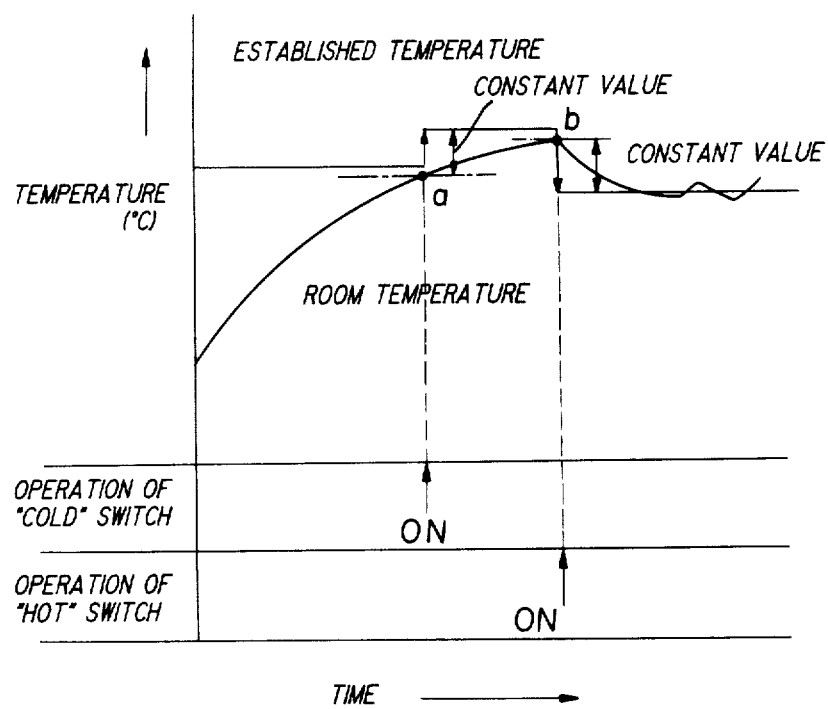
FIG. 18 is a diagram showing how the room temperature is controlled according to the ninth embodiment.

FIG. 18 is a characteristic diagram showing change in the room temperature in the room-warming operation according to the ninth embodiment. The room-warming operation is started to reach the initially established temperature. In the condition that the room temperature reaches the point a near the established temperature, when the user still feels cold, he operates the "cold" switch, whereby the established temperature is brought to a predetermined higher level with respect to the room temperature at the time of operating the "cold" switch to thereby continue the room-warming operation to increase the room temperature. On the other hand, when the "hot" switch is operated, the established temperature is brought to a predetermined lower level with respect to the room temperature (the point b) at the time of operating the "hot" switch, whereby the room-warming operation is stopped until the room temperature is equal to the established temperature. The values to be changed for the established temperature in accordance with the operation of the switch unit may be finely adjusted so as to meet feeling of temperature of the user.

Figure 19:
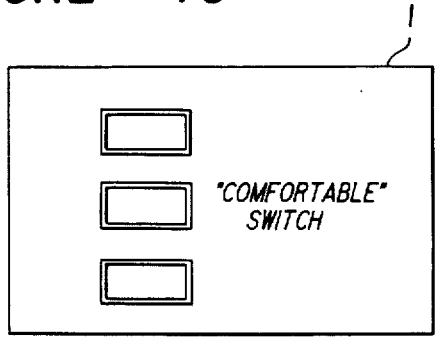
FIG. 19 is a front view showing a switch unit used for the ninth embodiment.
Figure 20:
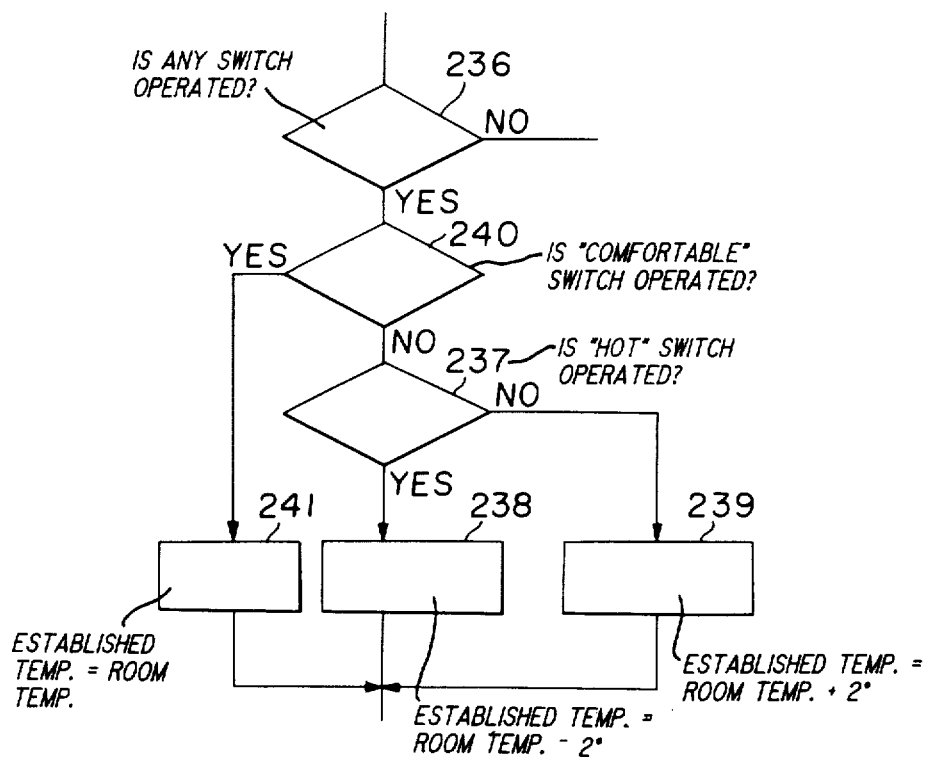
FIG. 20 is a flow chart showing the operation according to a tenth embodiment of the present invention.

FIGS. 19 and 20 show the tenth embodiment.

FIG. 19 shows a switch unit used for the air conditioning method and the switch unit comprises a "comfortable" switch in addition to the "hot" switch and the "cold" switch.

The program of determination of the established temperature is shown in FIG. 20.

The air conditioning method according to the tenth embodiment is the same as that of ninth embodiment provided that Steps 40 and 41 are added. Namely, when the "comfortable" switch is operated, the room temperature at the time of operating the switch is determined as the established temperature, whereby the current condition is maintained.

Figure 21:
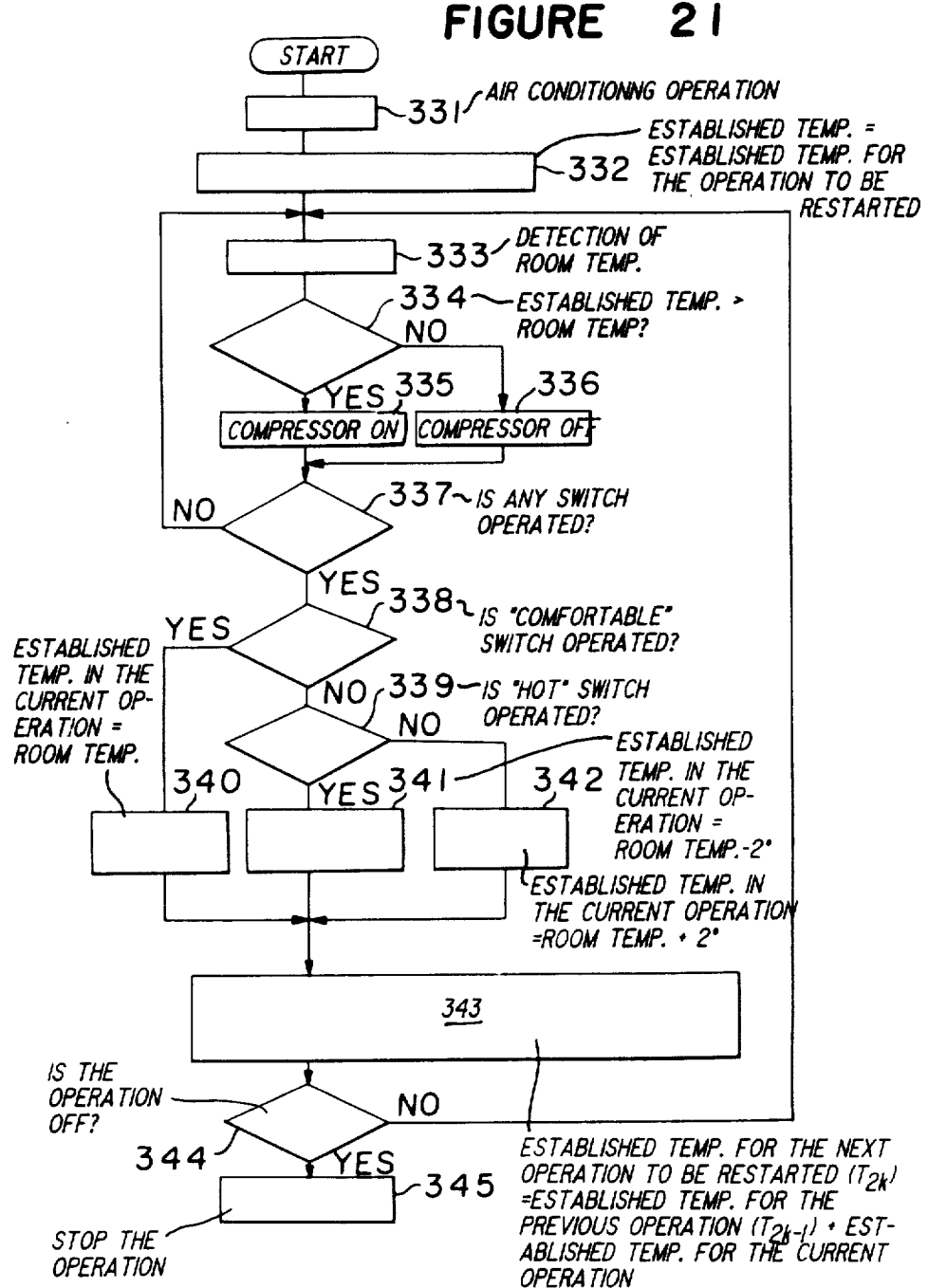
FIG. 21 is a flow chart showing the operation of an eleventh embodiment of the present invention.

FIG. 21 is a flow chart showing the eleventh embodiment of the present invention. The construction of the control unit used for the eleventh embodiment is same as that shown in FIG. 12 provided that the switch unit comprises the "hot" switch, the "comfortable" switch and the "cold" switch as shown in FIG. 19.

The air conditioning method according to the eleventh embodiment will be described with reference to the flow chart of FIG. 21.

When room-warming operation is initiated at Step 331, an established temperature is determined based on the data memorized as the established temperature determined in the previous room-warming operation at Step 332.

At Step 333, a room temperature detected by the thermal sensitive resistance element 52 is input in the microcomputer 2. At Step 334, the room temperature is compared with the established temperature, whereby an instruction of ON or OFF of the compressor 56 is provided through the output circuit 6 in conformity with operational mode at Step 335 or Step 336.

Steps 337 through 342 concern determination of the established temperature to be currently used. Namely, when operation of any switch is detected at Step 337, determination is made as to which switch has been operated at Steps 338 and 339. When operation of the "comfortable" switch is detected at Step 338, the currently established temperature in the current operation is changed to the room temperature at Step 340. When operation of the "hot" switch is detected at Step 339, the currently established temperature is decreased by a predetermined value, for instance 2 degree, with reference to the room temperature at the time of operating the "hot" switch. When operation of the "cold" switch is detected, the currently established temperature is increased by a predetermined value, for instance 2 degree, with reference to the room temperature at the time of operating the "cold" switch.

In the following, description will be made as to determination of an established temperature for restart operation which is carried out at Step 343.

When any of the switches is operated, the currently established temperature is changed, and at the same time, the established temperature for the next operation (i.e. the operation to be restarted) is determined according to a calculation formula shown a block of Step 343. The established temperature $T_{2k}$ for the operation to be restarted is calculated to be an average value of the sum of the value of the established temperature $T_{2k+1}$ for restarted operation which has been stored and a value of the currently established temperature $T_{1k}$ which has been newly determined. The newly determined established temperature $T_{2k}$ for the next operation is memorized in the memory 5, and is used as the established temperature at the time of starting the room-warming operation at Step 332 when the operation is initiated at Step 331 after the operation has been stopped at Steps 344 and 345.

Figure 22:
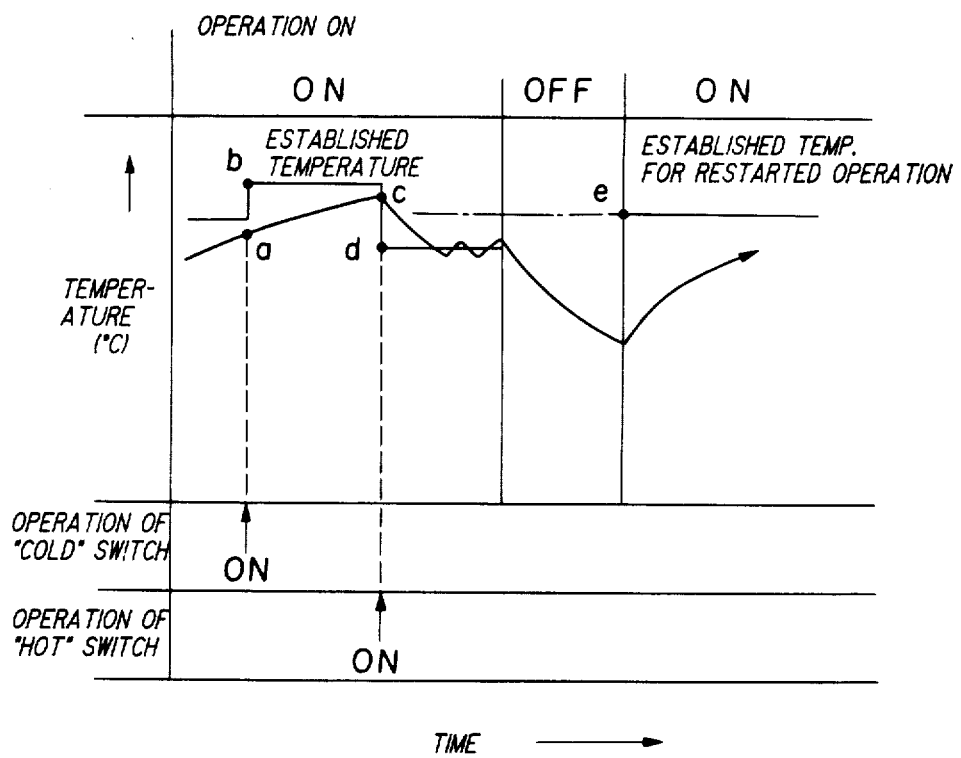
FIG. 22 is a diagram showing how the room temperature is controlled according to the eleventh embodiment.

FIG. 22 is a characteristic diagram showing change in room temperature during the room-warming operation according to the eleventh embodiment.

In the condition of room temperature at the point a which is near the established temperature during the room-warming operation, when the "cold" switch is operated by the user who still feels cold, the established temperature is changed to a predetermined higher level b with respect to the room temperature at the time of operating the "cold" switch, whereby the room-warming operation is continued to increase the room temperature. On the other hand, when the "hot" switch is operated, the established temperature is changed to a predetermined lower level d with respect to the room temperature at the level c, whereby the operation of the compressor is stopped until the room temperature becomes the established temperature.

When the air conditioner is restarted, the established temperature at the starting time is determined to be a level e which is determined by the average of the established temperature level b and the established temperature level d. Thus, the established temperature changed according to the users feeling of temperature is used as the averaged established temperature for the next operation. Namely, the established temperature selected by the preference of the user can be obtained. Accordingly, a comfortable condition is provided without considering the established temperature by merely starting the room-warming operation of the air conditioner.

Figure 23:
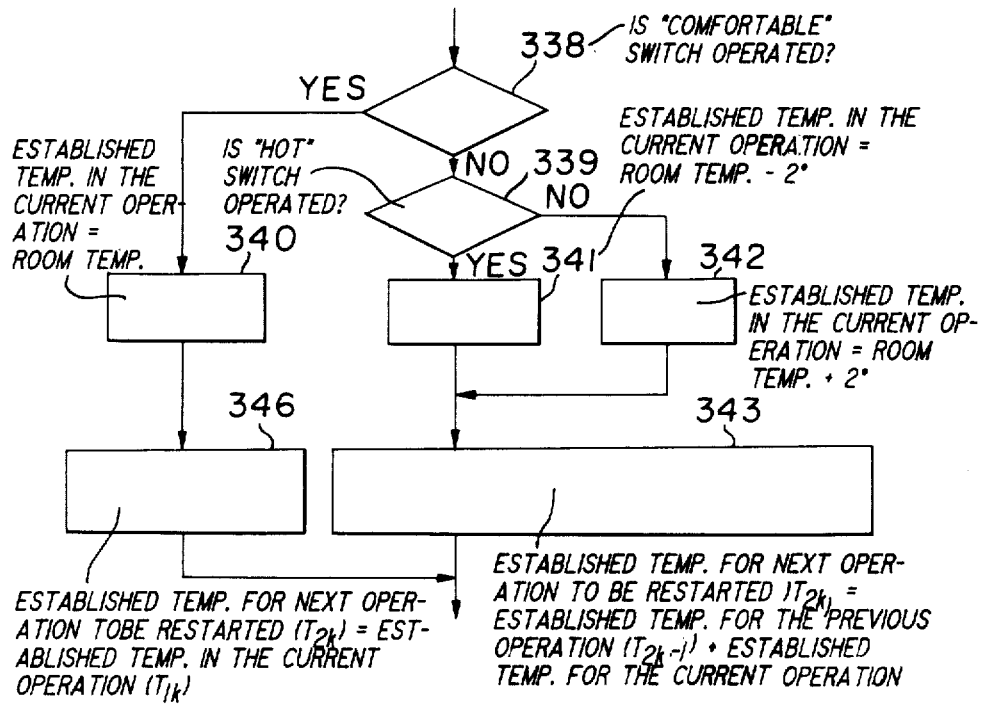
FIG. 23 is a flow chart showing the operation of a twelfth embodiment of the present invention.

In the eleventh embodiment, each of the switches has the same priority with respect to the established temperature for the operation to be restarted. If the user wishes to realize the condition which he feels comfortable for the next operation at a first priority, the flow chart as shown in FIG. 21 may be modified to that as in FIG. 23. Namely, when operation of the "comfortable" switch is detected at Step 338, the currently established temperature is made equal to the room temperature at Step 340, and the established temperature for the operation to be restarted is also made equal to the currently established temperature, i.e. the current room temperature at Step 346.

As described above, in accordance with the ninth to the eleventh embodiments, the established temperature is changed in accordance with the switch corresponding to the users feeling of temperature, and the established temperature for the operation to be restarted is automatically determined so as to meet the users preference on the basis of the data of the previously determined established temperature. Accordingly, it is possible to provide easily a comfortable condition according to the users preference.

Description has been made as to the room-warming operation in the air conditioning methods as described above. However, it is possible to carry out room-cooling operation by inverting an ON or OFF instruction to be provided to the compressor.

Values to be changed for the established temperature depending on the operation of the switches may be adjusted to suitable values in consideration of the users feeling of temperature.

The name of the switches may be determined as far as users feeling of temperature is reflected to them.

We claim:

1. An air conditioning method with use of an air conditioner which comprises a compressor placed in an air conditioner main body, a temperature detector for detecting temperature in a room, an A/D converter for converting an output from the temperature detector into a digital signal and a microcomputer which stores the output of said A/D converter and a set point value of temperature and compares the former with the latter thereby to produce an instruction signal to said compressor, characterized by comprising:

a step of determining whether or not an input signal is produced from a plurality of switches for specifying a condition, said input signal being produced by a "hot" switch to be operated by a user when he feels hot and a "cold" switch to be operated when he feels cold, a step of determining a set point temperature on the basis of the signal from said switches, wherein when said "hot" switch is operated, the set point temperature is changed to a temperature equal to the room temperature minus a predetermined value and when said "cold" switch is operated, the set point temperature is changed to a temperature equal to the room temperature plus a predetermined value, a step of comparing data provided at said set point temperature determining step with the room temperature detected by said temperature detector to produce a signal, and, a step of controlling said compressor based on said signal as a result of the comparison.

2. The air conditioning method according to claim 1, wherein an illumination display is performed depending on the comparison of the set paint temperature with the room temperature detected by said temperature detector.

3. The air conditioning method according to claim 1, wherein said set paint temperature has an upper limit value and a lower limit value in said step of determining of the set paint temperature.

4. The air conditioning method according to claim 1, wherein said input signal is also produced by a "comfortable" switch to be operated when a user feels comfortable.

5. An air conditioning method with use of an air conditioner which comprises a compressor placed in an air conditioner main body, a temperature detector for detecting temperature in a room, an A/D converter for converting an output from the temperature detector into a digital signal and a microcomputer which stores the output of said A/D converter and a set point value of temperature and compares the former with the latter thereby to produce an instruction signal to said compressor, characterized by comprising:

a step of determining whether or not an input signal is produced from a plurality of switches for specifying a condition, a step of determining a set point temperature on the basis of the signal from said switches, a step of comparing data provided at said set point temperature determining step with the room temperature detected by said temperature detector to produce a signal, and, a step of controlling said compressor based on said signal as a result of the comparison, wherein said input signal is produced by a "hot" switch to be operated by a user when he feels hot, or a "cold" switch to be operated when he feels cold, and there is a further step of prohibiting said input signal of said switches from entering when difference between said set point temperature and said room temperature is out of a predetermined range.

6. An air conditioning method with use of an air conditioner which comprises a compressor placed in an air conditioner main body, a temperature detector for detecting temperature in a room, an A/D converter for converting an output from the temperature detector into a digital signal and a microcomputer which stores the output of said A/D converter and a set point value of temperature and compares the former with the latter thereby to produce an instruction signal to said compressor, characterized by comprising:

a step of determining whether or not an input signal is produced from a plurality of switches for specifying a condition, said input signal being produced by a "hot" switch to be operated by a user when he feels hot, a "cold" switch to be operated when he feels cold, or a "comfortable" switch to be operated when he feels comfortable, a step of determining a set point temperature on the basis of the signal from said switches, wherein when said "comfortable" switch is operated, the set point temperature is changed to the current room temperature, a step of comparing data provided at said set point temperature determining step with the room temperature detected by said temperature detector to produce a signal, and, a step of controlling said compressor based on said signal as a result of the comparision.

7. An air conditioning method with use of an air conditioner which comprises a compressor placed in an air conditioner main body, a temperatuer detector for detecting temperature in a room, an A/D converter for converting an output from the temperature detector into a digital signal and a microcomputer which stores the output of said A/D converter and a set point value of temperature and compares the former with the latter thereby to produce an instruction signal to said compressor, characterized by comprising:

a step of determining whether or not an input signal is produced from a plurality of switches for specifying a condition, a step of determining a set point temperature on the basis of the signal from said switches, a step of comparing data provided at said set point temperature determining step with the room temperature detected by said temperature detector to produce a signal, and, a step of controlling said compressor based on said signal as a result of the comparison, wherein said input signal is produced by a "hot" switch, a "cold" switch or a "comfortable" switch to be operated by a user according to his feeling of temperature, and wherein there are a step of determining a set point temperature for the current operation on the basis of an input from said temperature detector and an input from one of said switches and a step of determining a set point temperature for an operation to be restarted after the current operation has been stopped.

8. The air conditioning method according to claim 7, wherein in said step of determining an established temperature for the current operation, when said "hot" switch or said "cold" switch is operated, said established temperature is determined by increasing or decreasing the current room temperature by a predetermined value.

9. The air conditioning method according to claim 7, wherein in said step of determining the established temperature for the operation to be restarted, the established temperature for the restarted operation is determined by the average value of the established temperature of the previous operation which has been stored and an established temperature in the current operation.

10. The air conditioning method according to claim 7, wherein in said step of determining the established temperature for the restarted operation, the established temperature determined in the current operation is used for the established temperature for the restarted operation only when said "comfortable" switch is operated.

* * * * *

UNITED STATES PATENT AND TRADEMARK OFFICE
CERTIFICATE OF CORRECTION

PATENT NO. : 4,715,191

DATED : Dec. 29, 1987

INVENTOR(S) : Hiroyuki Unemura et al.

It is certified that error appears in the above-identified patent and that said Letters Patent is hereby corrected as shown below:

On the title page

--Priority data is incorrectly recorded.
It should read:

```
Oct. 15, 1985  [JP] Japan.......60-229075
Oct. 15, 1985  [JP] Japan.......60-229071
Oct. 15, 1985  [JP] Japan.......60-229072
Oct. 15, 1985  [JP] Japan.......60-229073
Jan.  8, 1986  [JP] Japan.........61-1544--
```

Signed and Sealed this

Seventh Day of June, 1988

Attest:

DONALD J. QUIGG

Attesting Officer

Commissioner of Patents and Trademarks